(No Model.) 2 Sheets—Sheet 2.
S. D. POOLE.
WHEEL PLOW.
No. 523,176. Patented July 17, 1894.
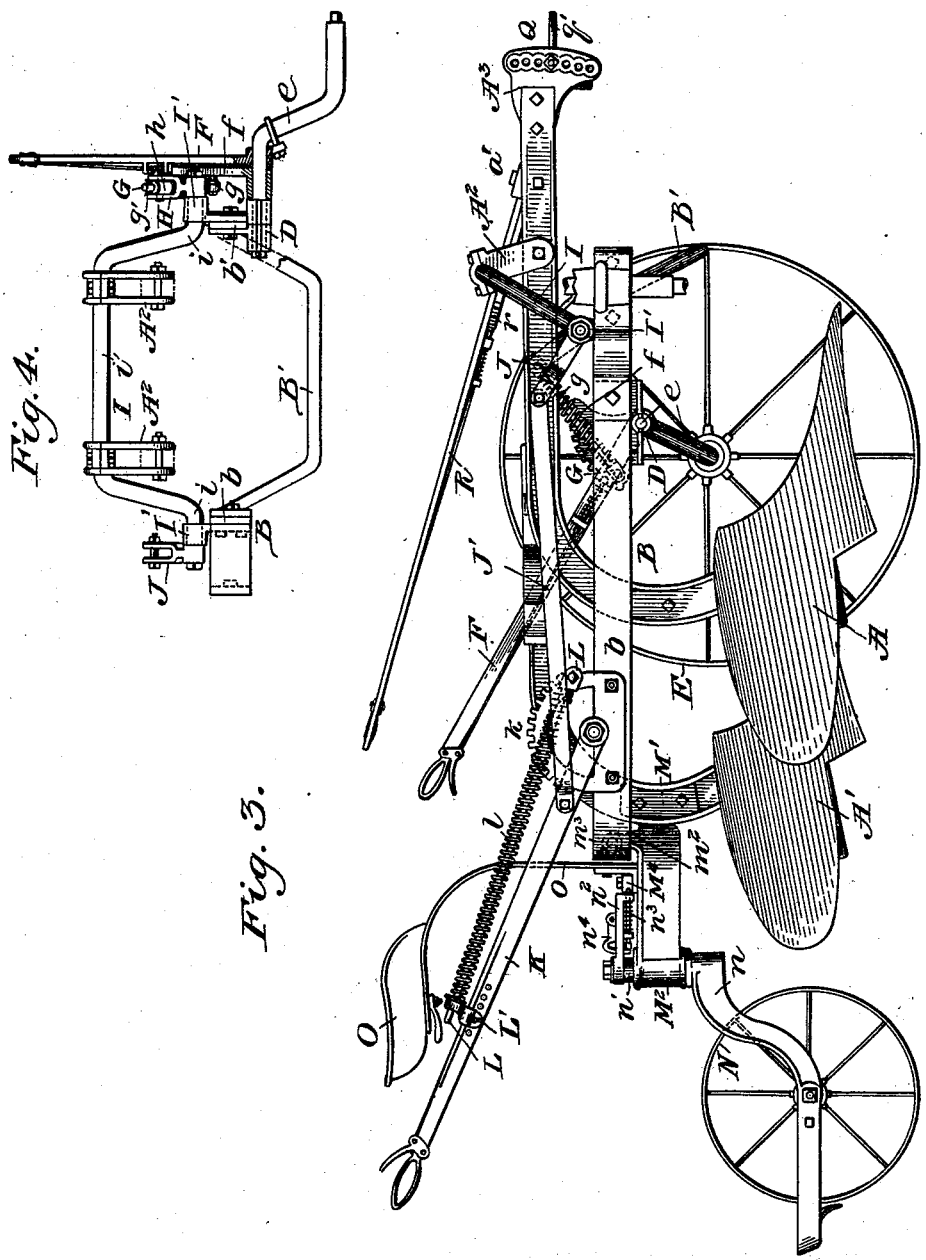
Witnesses
Inventor
Staley D. Poole
By Butterworth & Dowell
his Attorneys

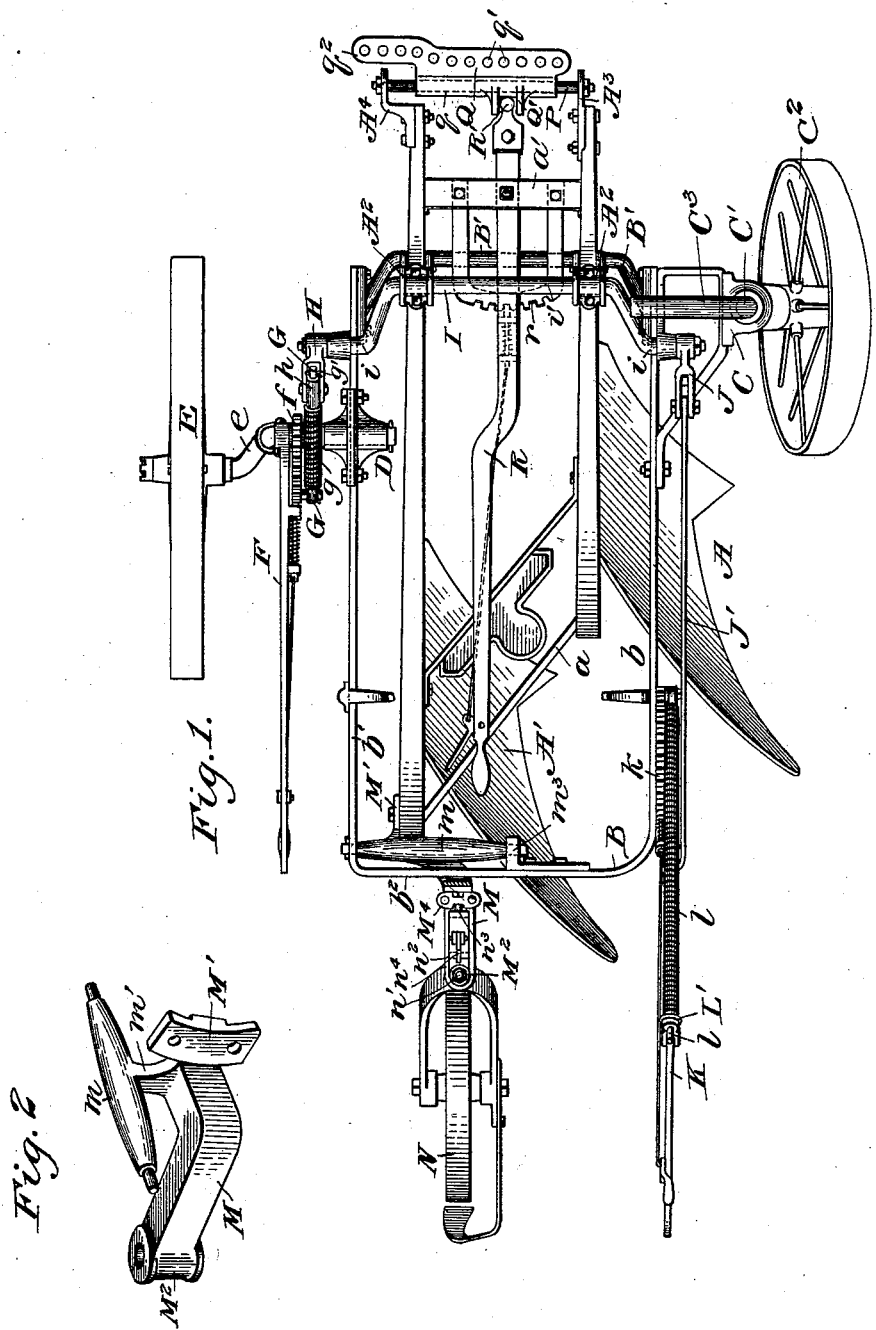

UNITED STATES PATENT OFFICE.

STALEY D. POOLE, OF MOLINE, ILLINOIS, ASSIGNOR TO THE DEERE & COMPANY, OF SAME PLACE.

WHEEL-PLOW.

SPECIFICATION forming part of Letters Patent No. 523,176, dated July 17, 1894.

Application filed January 20, 1894. Serial No. 497,556. (No model.)

*To all whom it may concern:*

Be it known that I, STALEY D. POOLE, a citizen of the United States, residing at Moline, in the county of Rock Island and State of Illinois, have invented certain new and useful Improvements in Wheel-Plows; and I do hereby declare the following to be a full, clear, and exact description of the invention, such as will enable others skilled in the art to which it appertains to make and use the same.

This invention is an improvement in wheeled plows, having especial reference to double gang plows; and its objects are to have the draft strain directly on the plow beam or beams; to prevent oscillating motions of the frame affecting the working positions of the plow; to keep the furrow wheel always in the same position relative to the plow bottoms so that the wheels must always carry the entire load; and while practically employing one lever to adjust both plows and wheels simultaneously to provide for independent adjustments of the land wheel.

Further objects are to utilize the power of springs in effecting the lifting and lowering of the plows; to enable the driver by shifting one lever to raise or lower the plow or plows, and simultaneously, to depress or elevate the land wheel in relation to the frame, so that the plows will always be kept in an upright and level position; and finally to enable the draft strain to be adjusted by the driver at will, whether the machine is or is not in operation.

These objects are attained by my invention which comprises, first, a novel means for simultaneously elevating the plows, and simultaneously shifting the land wheel; second, novel mountings of the land wheel on the frame, whereby it can pass over obstructions without affecting the positions of the plows; third, an improved hinge connection between the frame, and the plow-beam and caster wheel; and fourth, an improved adjustable clevis or draft regulating device.

These and other minor objects and novel features of the invention, will be comprehended from the following detailed description, and the invention consists essentially in the novel combinations and construction of parts summarized in the claims.

Referring to the accompanying drawings by letters of reference marked thereon, Figure 1 is a top plan view of a gang plow embodying my invention. Fig. 2 is a detail view of the casting which connects the caster wheel and plow-beams to the frame. Fig. 3 is a furrow-side side elevation of the plow, the furrow-wheel being broken away. Fig. 4 is a detail front view showing the arched-shaft and the land-wheel connections.

Referring by letters to said drawings,—A, A', designate the beams of two ordinary plows, placed side by side, and the one in advance of the other having its beam shortened. The plows may have wheel colters if desired. The beams are rigidly connected near their rear ends by braces $a$, and near their front ends by a transverse bar $a'$, so the plows are kept the proper relative distance apart.

The frame B, to which the wheels are attached, is approximately rectangular, its sides $b$, $b'$, and rear end $b^2$, being formed of a flat metal bar or bars arranged vertically edgewise, and its front end of an inverted arched rod or bar B', which underlies the front ends of the plow-beams, as indicated in Fig. 1. To the front right-hand corner of the frame is secured a casting C, in which is journaled the vertical portion of a cranked shaft C', on the lower end of which is the furrow wheel $C^2$, the shaft being free to turn, the furrow wheel can swing horizontally, but has no vertical movement. To the upper horizontal arm $C^3$, of said shaft the tongue (not shown) may be secured. It would be easy, if desired, to make this furrow-wheel vertically adjustable, however. To the left-hand side of the frame, in rear of the furrow-wheel, near the center of the frame is bolted a depending sleeved casting D, the sleeve lying below and at right angles to the side of the frame, and in it is journaled the upper end of a double-cranked shaft $e$, on the lower horizontal end of which is mounted the land-wheel E, in the usual manner. On the upper end of this shaft, exterior to the frame, is keyed a hand-lever F, provided with an ordinary hand-latch by which it can be locked to a toothed segment $f$, loosely strung on shaft $e$, intermediate the lever and casting D. This segment is yieldingly held in one position by means of a spring-controlled rod G, which is pivotally connected by one end to the side of the segment, and its other end plays through a rocking eye $h$, pivotally mounted on the frame, or in a support affixed to the frame, and, as shown, it is mounted in the end of a bifurcated crank arm H, rigidly secured on the extremity of an arched rock-shaft I, hereinafter referred to. An expansive helical spring $g$, strung on rod G, intermediate eye $h$, and the connection of the rod to the segment, normally tends to force the segment backward and withdraw the rod from eye $h$, but this is prevented by a key $g'$, in the end of the rod. The function of these parts is to allow the land-wheel to pass over obstructions without affecting the frame. For instance, when the machine is in operation, (after wheel E, is adjusted to proper position relative to the frame by rocking shaft $e$, by lever F, and held in such position by locking lever F, to segment $f$,) should wheel E, strike a rock and have to ride over it, instead of its lifting the land side of the frame in so doing, (thereby lifting the plow shares and causing an uneven furrow,) it rocks shaft $e$, throwing lever F, and segment $f$, forward, contracting spring $g$, and passes over the obstruction without noticeably affecting the frame, but as soon as it has passed the obstruction the expansive force of spring $g$, throws the segment, lever, shaft, and land wheel back to normal position. The spring $g$, should be of sufficient power to normally hold the parts in the proper working position.

I, designates an arched or inverted U-shaped shaft having its extremities $i$, $i$, bent outwardly, about parallel with its central portion $i'$, and journaled in castings I', I', attached to opposite sides of the frame, near its front end. The central portion $i'$, of the shaft is pivotally connected by links $A^2$, to the plow beams near the front ends thereof as shown. On the left hand end of shaft I, exterior to the frame, crank arm H, is secured, and on the right-hand end thereof a crank arm J, is rigidly secured at about right angles to the bends of the shaft. This arm J, is connected by a rod J', to a lever K, pivoted on the frame, and provided with an ordinary hand latch adapted to lock the lever to a segment $k$, fixed to the frame as shown in Fig. 3. A rod L, is pivoted at one end to segment $k$, and its other end plays through an eye on a small casting L', adjustably bolted to the lever K, and an expansive helical spring $l$, is strung on the rod and facilitates the backward rocking of shaft I. The object of the shaft I, and connections as described, is to enable the plows to be swung clear of the ground, when turning corners, or when the machine is on the road, as by a backward pull on lever K, shaft I, is rocked backward, this causes the elevation of the plow beams, as indicated in Fig. 3, and simultaneously, through arm H, spring $g$, segment $j$, and lever J, the land wheel E, is moved downward and forward sufficiently to compensate for the loss of motion consequent on its position on the frame, thereby keeping the plows always in an upright and level position. The spring $l$, which is put under tension by the lowering of the plow-beams by its reaction materially assists the driver in effecting the elevation of the beam and the simultaneous depression of the land wheel as above described, and I consider its use in this connection quite important.

M, designates the rear or caster wheel casting, shown best in Fig. 2, roughly L-shaped and laid flat-wise; on the extremity of its short arm is a forwardly extending flange M', rigidly bolted to the rear plow-beam. A stub-shaft $m$, lying parallel with the short arm and slightly above the same, is connected to the extremity thereof by a web $m'$, or in other suitable manner; this shaft extends about equally on each side of the web, its left-hand end extending beyond the extremity of the short arm of the casting. The ends of the stub-shaft are reduced to form journals $m^2$, which are engaged with an opening in the left side piece of the frame, and in a bracket $m^3$, attached to the rear end piece of the frame, as shown in Fig. 1, so that the stub-shaft lies close to and parallel with the rear end piece of the frame, and the long arm of the casting M, projects horizontally rearward about in line with the land-side plow. The frame is thus hinged to the caster wheel casting, which is bolted rigidly to the beam of the rear plow, and the caster wheel being secured to the plow beam instead of the frame always retains the same relative position to the plow bottom, so that the wheels must always carry the entire load.

On the rear end of casting or support M, is a vertical sleeve $M^2$, in which is journaled the shaft $n'$, of the caster wheel holder $n$, the holder and caster wheel N, being of any suitable construction. On the upper end of shaft $n'$, is keyed an arm $n^2$, carrying a spring bolt $n^3$, adapted to engage a keeper $M^4$, secured to casting M, and lock the caster wheel rigidly in line with the land-side plow. The bolt can be retained by a catch $n^4$,—these particular devices may be of any desired construction forming no part of my present invention. The casting thus forms a hinge connection between the frame and caster wheel, and between the frame and the land side plow-beam. This allows free adjustment and movement of the front ends of the plow-beams in relation to the frame, and of the front end of the frame in relation to the beams, therefore the vibrations of the frame due to travel of the land and furrow wheels over rough ground and obstacles does not affect the plows, and they will cut furrows of regular depth, the several described connections between the frame and beams making an excellent "floating" mounting of the plows on the frame. The driver's seat O, is also mounted on the bracket M, the support $o$, thereof being bolted to the long arm of the casting as shown in Fig. 3. Thus the driver's body is not so much affected by the oscillations and vibrations of the frame: the foot-rests o', o', are attached to the frame.

P, designates a short shaft strung between brackets A³, A⁴, respectively, attached to the front ends of beams A, A'. On this shaft is hung the clevis plate Q, which has a sleeve q, embracing the shaft, and a front perforated portion q', for the attachment of the double or single trees, portion q', being extended at one end q², considerably beyond the sleeve.

R, designates a lever fulcrumed on the cross-bar a', and having a vertical rounded T-head R', on its front end, which is loosely embraced between adjoining ears Q', on clevis Q, so that the clevis can turn on the shaft without obstruction by the head R', yet if lever R, be oscillated the clevis will be shifted longitudinally on shaft P, as will be evident from Fig. 1 of the drawings. Lever R, extends backward to near the driver's seat and is provided with an ordinary hand-latch adapted to engage a segmental rack r, attached to bar a', as shown. By shifting lever R, the clevis can be moved toward or from either plow-beam, and thus the driver can adjust the clevis while the machine is at work so as to equalize the strain upon the animals, or to give the most draft upon that plow which is encountering obstacles.

It will be noticed that the draft will be directly on the plows, instead of transmitted thereto through the frame. This throws the entire draft primarily on the plows, and is a practical advantage, lessening wear and strain both of the machine and animals.

All the levers referred to are within convenient reach of the driver. The parts referred to as "castings" may be wrought, or made of malleable metal, either in one piece or in parts subsequently united, as may be found most convenient to the builder.

Obviously many features of my invention are as applicable to single riding plows and to machines having three or more plows in a gang, as to the double gang plow I have selected to illustrate my invention.

Having thus fully described my invention, what I claim as new, and desire to secure by Letters Patent of the United States, is—

1. The combination of a plow, and a wheeled frame; with an arched rock shaft located above and journaled on the frame, means for rocking said shaft, and pivotal connections between said shaft and the plow, whereby the latter can be elevated or lowered by the rocking of said shaft, substantially as described.

2. The combination of a plow, a frame, a wheel adjustably mounted on the frame, a rock-shaft journaled on the frame and means for rocking and locking said shaft; with yielding connections between said shaft and said wheel mountings, and connections between said shaft and the plow, whereby upon the rocking of said shaft the plow can be elevated and said wheel simultaneously depressed, and a spring to assist said movement, substantially as described.

3. The combination of a plow, a frame, a wheel adjustably mounted on the frame, a rock-shaft located above and journaled on the frame, and means for rocking and locking said shaft; with yielding connections between said shaft and said wheel mountings and connections between the said shaft and the plow, whereby upon the rocking of said shaft the plow can be raised or lowered, and simultaneously said wheel elevated or depressed, substantially as specified.

4. The combination of the gang plows, the wheeled frame, and the arched rock-shaft journaled on said frame, and a lever arranged for rocking said shaft and a spring tending normally to raise said lever; together with the link connections between the arched portion of said shaft and the plow beams, substantially as described.

5. The combination of a plow, a wheeled frame, having a hinge connection with the rear end of the plow; an arched rock-shaft located above and journaled on said frame, means for rocking said shaft, and link connections between the arched portion of the shaft and the front end of plow, substantially as set forth.

6. The combination of a plow, a wheeled frame, one of the wheels of said frame being adjustably mounted thereon, a hinge connection between said frame and the rear end of the plow, and an arched rock-shaft mounted on said frame, means for rocking said shaft, and connections between the arched portion of the shaft and the front of plow beam and connections whereby when said shaft is rocked the said adjustable wheel is elevated or depressed, substantially as described.

7. The combination of the plow beam, the wheeled frame a caster wheel pivotally attached to said frame, a hinge connection between the rear end of said frame and the beam, and the adjustable connections between the front end of the beam and said frame, substantially as described.

8. The combination of a plow beam, a wheeled frame having a caster wheel pivotally attached thereto and provided with a hinged connection to the rear of said beam; the arched rock-shaft mounted on the front end of said frame, means for rocking and locking said shaft, and the link connections between said shaft and the front of plow beam, substantially as described.

9. The combination of the plow, the casting attached thereto, the caster wheel connected to said casting, the wheeled frame hinged to said casting, the arched rock-shaft journaled on the front of said frame, the devices for rocking and locking said shaft, and link connections between the arch of said shaft and the plow beam, substantially as set forth.

10. The combination of the plow, the caster wheel attached thereto, a wheeled frame having a hinged connection to said plow, near the caster wheel; the wheels carrying the front end of said frame, one of said wheels being adjustable, the arched rock-shaft mounted on the frame, means for rocking and locking said shaft, connections between the arch of said shaft and the plow beam, and connections whereby the rocking of said shaft causes the elevation or depression of said adjustable wheel, substantially as set forth.

11. The combination with the plow and frame, of the casting provided with a caster-wheel and having a stub shaft for pivotally connecting the same to said frame, and means for securing said casting to the plow beam, all constructed and arranged substantially as and for the purpose described.

12. The combination of the plow, the caster wheel support attached thereto, the wheeled frame hinged to said support, and the driver's seat mounted on said support; with connections between the front end of the frame and the front of plow beam, substantially as and for the purpose described.

13. The combination of the frame, the rock-shaft carrying a wheel, the segment loosely mounted on said shaft, and the lever fixed on said shaft, and means for locking the lever to the segment; with a spring adapted to hold the segment in one position relative to the frame, but allowing it to rock with the shaft and thereby relieve strain on the wheel when it encounters obstructions, substantially as described.

14. The combination of the plow, the frame, a cranked shaft carrying a wheel journaled on said frame, the segment loosely mounted on said shaft, and means for rocking said shaft and locking it to said segment; an arched rock-shaft connected to said frame, connections between said shaft and the plow beam, and a spring-controlled connection between said rock-shaft and said segment, all substantially as described.

15. The combination of the plow, a caster wheel attached thereto, the frame having a hinged connection to said plow near the caster wheel, a wheel adjustably mounted on said frame, and a spring controlled device for normally holding said wheel in one position, but permitting it to move to overcome obstructions, substantially as described.

16. The combination of the plow, the caster wheel attached thereto, the frame having a hinged connection to said plow near the caster wheel, the arched rock shaft mounted on the frame, means for rocking and locking said shaft and connections between the arch of said shaft and the plow beam: with the furrow wheel attached to said frame; the cranked shaft carrying the land wheel attached to the opposite side of said frame, the lever fixed on said shaft, a segment loosely mounted on said shaft, means for locking said lever to said segment, and a spring-controlled connection between said rock-shaft and said segment, all substantially as set forth.

17. The combination of the frame, the casting—the crank shaft—the wheel on the lower end thereof, the segment—loosely mounted on the upper end of said shaft, the lever—fixed to said shaft having a hand latch engaging said segment, and the rock shaft and spring connection between said shaft and segment for controlling the position of said segment, substantially as and for the purpose specified.

18. The combination of the plow, the frame, a cranked shaft carrying a wheel journaled on said frame, an arched rock-shaft connected to said frame, connections between said shaft and the plow beam, and a spring-controlled connection between the rock-shaft and the cranked shaft, substantially as described.

In testimony whereof I affix my signature in presence of two witnesses.

STALEY D. POOLE.

Witnesses:
WM. BUTTERWORTH,
A. R. EBI.